Figure 1:
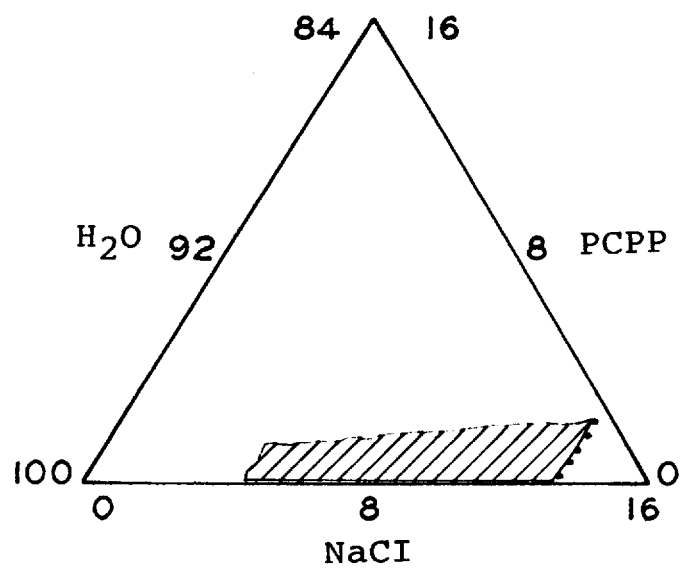

United States Patent
Andrianov et al.

[11] Patent Number: 5,842,471
[45] Date of Patent: Dec. 1, 1998

[54] PURIFICATION OF POLYPHOSPHAZENE POLYACIDS

[75] Inventors: Alexander K. Andrianov, Belmont; Mark P. LeGolvan, West Roxbury; Yuri Svirkin, Belmont; Sameer S. Sule, Marlboro, all of Mass.

[73] Assignee: Virus Research Institute, Inc., Cambridge, Mass.

[21] Appl. No.: 856,073

[22] Filed: May 14, 1997

[51] Int. Cl.⁶ .................................................... C08G 79/02
[52] U.S. Cl. .......................... 528/398; 528/399; 528/488; 528/489; 528/168
[58] Field of Search .................................. 528/398, 399, 528/488, 489, 499, 168

[56] References Cited

U.S. PATENT DOCUMENTS

| | | |
|---|---|---|
| 4,267,311 | 5/1981 | Elefritz et al. . |
| 4,477,656 | 10/1984 | Longo et al. . |
| 4,576,806 | 3/1986 | Juneau . |
| 4,656,246 | 4/1987 | Chang et al. . |
| 5,053,451 | 10/1991 | Allcock et al. . |
| 5,098,574 | 3/1992 | Chambrette et al. . |

OTHER PUBLICATIONS

Ikegami et al., *J. Polymer Sci.*, vol. 36, pp. 133–152 (1962).
Axelos et al., *Macromolecules*, vol. 27, pp. 6594–6602 (1994).

*Primary Examiner*—Duc Truong
*Attorney, Agent, or Firm*—Elliot M. Olstein; Raymond J. Lillie

[57] ABSTRACT

A method for purification of a polyphosphazene polyacid or acid salt thereof in which a polyphosphazene polyacid or acid salt thereof is dissolved in a concentrated aqueous solution of a salt of monovalent ions. The resulting aqueous solution of the polyphosphazene polyacid or acid salt thereof and the at least one salt of monovalent ions then is diluted to reduce the concentration of the at least one salt of monovalent ions, whereby the polyphosphazene polyacid or acid salt thereof is precipitated. The precipitated polyphosphazene polyacid or acid salt thereof then is recovered.

10 Claims, 1 Drawing Sheet

PURIFICATION OF POLYPHOSPHAZENE POLYACIDS

This invention relates to the purification of polyphosphazene polyacids or acid salts thereof. More particularly, this invention relates to the purification of polyphosphazene polyacids or acid salts thereof by dissolving the polyphosphazene polyacid in a concentrated solution of a salt of monovalent ions, followed by precipitating the polyphosphazene polyacid or salt thereof by diluting the concentrated solution of the salt of monovalent ions.

Polyorganophosphazenes are polymers with backbones consisting of phosphorus and nitrogen atoms separated by alternating single and double bonds. (—N=P—). Each phosphorus atom is bonded covalently to two organic side groups such as alkoxy, aryloxy, and alkylamino. Side groups provide polyorganophosphazenes with properties that make them useful in a variety of applications, such as, for example, flame retardant and conductive materials elastomers, and biomaterials. (Allcock, "Polyphosphazenes," in Inorganic Polymers, Mark, et al., eds., Prentice Hall, New Jersey, pgs. 61–139 (1992)).

Polyphosphazene polyelectrolytes are polyphosphazenes that have ionized or ionizable side groups that render the polyphosphazene anionic, cationic, or amphiphilic. The ionic groups may be acids, bases, or salts. Such groups also may be dissociated at least partially. Polyphosphazene polyacids are polyphosphazene polyelectrolytes that contain acid groups or acid salt groups. Any ion may be used as a counterion of the salt. Such ions include, but are not limited to, sodium, potassium, ammonium, chloride, and bromide. Polyphosphazene polyacids also may contain non-ionic side groups.

Polyphosphazene polyacids may be employed as biomaterials, membranes, or controlled release and drug delivery systems. For example, U.S. Pat. Nos. 5,494,673, issued to Andrianov, et al., and 5,529,777, issued to Andrianov, et al., disclose that poly [di(carboxylatophenoxy) phosphazene], or PCPP, may be used as an immunoadjuvant and is an excellent material for microencapsulation.

Polyorganophasphazenes may be prepared by macromolecular substitution of a reactive intermediate, such as poly(diclorophosphazene) with a wide range of chemical reagents or mixtures of reagents in accordance with methods known to those skilled in the art. The reaction mixture, in general, is heterogenous, and the final product may be contaminated with raw materials and reaction by-products, such as alkali metal salts. Thus, a need exists for an effective and simple process for polyphosphazene purification.

Although methods for purification of polyphosphazenes have been described, most of these methods were developed for water-insoluble uncharged polyphosphazenes, and are based upon the solubility of these polymers in organic solvents and insolubility in aqueous solutions. Examples of such methods are disclosed in U.S. Pat. No. 4,576,806, issued to Juneau; U.S. Pat. No. 4,267,311, issued to Elefritz; and U.S. Pat. No. 4,477,656, issued to Longo, et al. Such methods, however, are not applicable in the case of water-soluble polyphosphazene polyelectrolytes.

U.S. Pat. No. 4,656,246, issued to Chang, et al., discloses the purification of water soluble polyphosphazene by heating a polyphosphazene solution to precipitate the polymer and recovering the precipitate. This method, however, is limited to polyetheroxy substituted polyphosphazenes having lower critical solubility temperatures.

U.S. Pat. No. 5,098,574, issued to Chambrette, et al., teaches that aqueous solutions or suspensions of polyphosphazenes can be purified by contacting the solution or suspension with semi-permeable membranes. This method, however, requires the use of complex equipment, and is difficult to employ with polyelectrolytes and polymers having high molecular weights.

U.S. Pat. No. 5,053,451 issued to Allcock, et al., discloses the purification of poly [di(carboxylatophenoxy) phosphazene], or PCPP, in aqueous solution using dialysis, and by precipitating the polymer with hydrochloric acid. The PCPP then is isolated by centrifugation, and the isolated PCPP is vacuum dried. The acid precipitation, however, provides a low content of polymer in the final product in that such acid precipitation is inefficient in removing some of the reaction by-products, such as, for example, p-hydroxybenzoic acid. In addition, the dialysis portion of the purification is time-consuming and difficult to scale up. This method also results in the isolation of PCPP in its acid form, which is insoluble in aqueous solutions of neutral pH and should be converted to the salt form by additional treatment of PCPP with base prior to use.

It is therefore an object of the present invention to purify polyphosphazene polyacids or acid salts thereof such that there is provided an increased yield of the purified product, and to reduce the contamination of the polyphosphazene polyacid with raw materials or reaction by-products. The present invention is not time-consuming and does not require the use of elaborate equipment. The present invention also can yield polyphosphazene polyacids in their acid salt forms. Such acid salts of polyphosphazene polyacids are water soluble. The present invention thus eliminates the need for an additional step whereby the polyphosphazene polyacid is treated with base.

In accordance with an aspect of the present invention, there is provided a method for the purification of a polyphosphazene polyacid or acid salt thereof. The method comprises dissolving the polyphosphazene polyacid or acid salt thereof in an aqueous solution of at least one salt of monovalent ions. The at least one salt of monovalent ions is present in the aqueous solution at a concentration which is sufficient to dissolve the polyphosphazene polyacid or acid salt thereof. The aqueous solution of the polyphosphazene polyacid or acid salt thereof and the at least one salt of monovalent ions then is diluted, thereby reducing the concentration of the at least one salt of monovalent ions. As the concentration of the at least one salt of monovalent ions is diluted, the polyphosphazene polyacid or acid salt thereof is precipitated from the solution. The precipitated polyphosphazene polyacid or acid salt thereof then is recovered.

In general, polyelectrolytes, including polyacids, are soluble in dilute salt solutions, but can be precipitated in solutions of higher salt concentration. (Ikegami, et al., J. Pol. Sci., Vol. 36, pgs. 133–152 (1962)). This effect, also known as "salting out," is a result of shielding or screening of repulsive interactions between the same type (i.e. positive or negative) of electrical charges along the polymer backbone with ions from the added salt at a high salt concentration, which causes collapse of the relatively hydrophobic polymer chain. Typical aqueous polymer/salt systems are described in Axelos, et al., Macromolecules, Vol. 27, pgs. 6594–6602 (1994). In general, in such two-phase systems, the polymer is in the form of a precipitate at a high salt concentration, and in solution at a low salt concentration. The solubility of polyphosphazene polyacids in aqueous salt solutions at salt concentrations higher than those at which the polyphosphazene polyacids are precipitated initially cannot be predicted from typical aqueous polymer/salt systems. Thus, applicants have found unexpectedly that polyphosphazene polyacids or acid salts may be dissolved in aqueous salt solutions at salt concentrations higher than those at which the polyphosphazene polyacids are precipitated initially.

In general, the at least one salt of monovalent ions is present in an initial concentration that is sufficient to provide for dissolution of the polyphosphazene polyacid or acid salt. In one embodiment, the at least one salt of monovalent ions is present in the aqueous solution at a concentration of at least 10% by weight, up to the concentration of a saturated solution. Preferably, the at least one salt of monovalent ions is present in the aqueous solution at a concentration of from about 10% to about 16% by weight, and more preferably from about 14% to about 16% by weight.

Salts of monovalent ions which may be employed include, but are not limited to, salts of Group I elements, and in particular sodium salts. Such sodium salts include, but are not limited to, sodium chloride, sodium bromide, sodium nitrate, sodium sulfate, and the sodium salt of hydroxybenzoic acid. Other salts of monovalent ions which may be employed include, but are not limited to, ammonium salts. In a preferred embodiment, the salt of monovalent ions is sodium chloride.

The aqueous solution which includes at least one salt of monovalent ions may, one embodiment, further include a base. The base may be present at a concentration of at least 2 mole/l, preferably at about 3 mole/l. Bases which may be employed include, but are not limited to, hydroxides of Group I elements, such as sodium hydroxide and potassium hydroxide.

Polyphosphazene polyacids or acid salts thereof which may be dissolved in the aqueous solution include, but are not limited to, those which include side groups of carboxylic acid or carboxylic acid salts or sulfonic acid or sulfonic acid salts. In one embodiment, the polyphosphazene polyacid is poly [di(carboxylatophenoxy) phosphazene], or poly [bis (carboxylatophenoxy) phosphazene], or PCPP. In general, the polyphosphazene polyacid or acid salt may be present in the solution at any concentration, preferably from about 0.1% by weight to about 5% by weight.

Upon dissolving the polyphosphazene polyacid or acid salt in the aqueous solution, the solution is diluted with water or an aqueous solution of a salt of monovalent ions, having a low concentration of such salt, such that the concentration of the salt of monovalent ions is lower than the initial concentration of the salt of monovalent ions. The concentration of the salt of monovalent ions is lowered such that the polyphosphazene polyacid or acid salt precipitates from the solution. The concentration of the salt of monovalent ions to which the solution is reduced is dependent upon the salt employed. In general, the aqueous solution is diluted such that the concentration of the salt of monovalent ions is less than 14% by weight, preferably from about 4k to about 10% by weight.

Upon precipitation of the polyphosphazene polyacid or acid salt from the solution, the polyphosphazene polyacid or acid salt then may be recovered by means known to those skilled in the art, such as, for example, by filtration or decantation. The recovered polyphosphazene polyacid or acid salt is readily soluble in neutral aqueous solutions.

Figure 2:
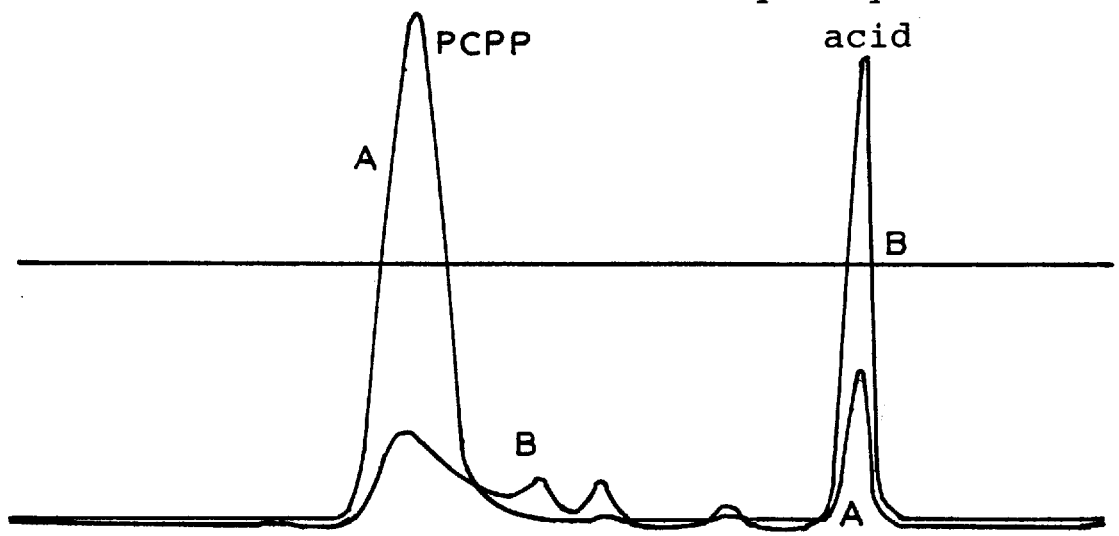

The invention now will be described with respect to the drawings, wherein:

FIG. 1 is a phase diagram for a system formed by mixing solutions of PCPP, sodium chloride, and potassium hydroxide, wherein the concentration of potassium hydroxide is 3 mole/l.; and FIG. 2 is an HPLC profile for samples of PCPP obtained by the purification process of the present invention (Sample A) and by acid precipitation (Sample B).

The invention now will be described with respect to the following examples; however, the scope of the present invention is not intended to be limited thereby.

EXAMPLE 1

The solubility of PCPP in aqueous solutions of salts in a range of salt concentrations was studied using a PCPP-NaCl-water-KOH system. 0.25 g. of PCPP, sodium salt (molecular weight 930,000 g/mol) was dissolved in water. The polymer solution then was mixed with sodium chloride and potassium hydroxide aqueous solutions of different concentrations and water in different rations. The concentration of potassium hydroxide was maintained as 3M in all mixtures. The mixtures were examined visually to determine the presence of a two phase system. A phase diagram then was established by plotting the percentage of NaCl in the mixture against percentages of PCPP and water (FIG. 1). Two regions were observed—homogenous solution and precipitate (two phase system) which is denoted as a shaded region on the phase diagram. As seen from the phase diagram, PCPP is not only soluble at a low salt concentration, but is also soluble at a high salt concentration, when the concentration of salt is higher than the salt concentration that causes precipitation of PCPP. Thus PCPP can be precipitated from the solution having a high salt concentration by dilution with water or a less concentrated salt solution.

EXAMPLE 2

Purification of PCPP 130 g of 2.35% polydichlorophosphazene solution in diglyme was modified with 96 g of sodium propyl paraben solution in 210 ml of diglyme and 85 g of propyl paraben. The reaction mixture was refluxed for 8 hours. After cooling to 95° C., 100 g of KOH in 111 ml water and 15 ml of water were added to the reaction flask. The organic solvent containing solution was decanted. The precipitate was then divided into two equal parts. The first part first was dissolved in 150 ml of 15% sodium chloride, and then half of it was precipitated with 300 ml of water. The sample supernatant was decanted and the polymer precipitate was vacuum dried (Sample A). The sample was soluble in water.

In a comparison experiment, the remaining part of the precipitate was dissolved in 150 ml of water and half of it was precipitated with 10% HCl to a pH of 1.0 as described in U.S. Pat. No. 5,053,451 issued at Allcock, et al. (Sample B). The sample supernatant was decanted and precipitate was vacuum dried. The sample was not soluble in water and had to be dissolved in NaOH solution.

The samples were analyzed by size exclusion HPLC using phosphate buffered saline (pH 7.4) as described in A. K. Andrianov and M. P. LeGolvan, *J. Appl. Pol. Sci.,* Vol.60, 2289–2295 (1996). The HPLC profiles are shown in FIG. 2. As seen from the figure, the sample produced by the purification process of the present invention (Sample A) contained a higher content of PCPP (in the form of its sodium salt), and a lower content of contaminant, i.e. hydroxybenzoic acid, and also eliminated three additional contaminants that are present in the sample purified by acid precipitation (Sample B). The content of PCPP in the samples was determined using UV calibration curves prepared with PCPP standards and was equal to 51.5% (w/w) for Sample A versus 12.4% (w/w) for Sample B.

It is to be understood, however, that the scope of the present invention is not to be limited to the specific embodiment described above. The invention may be practiced other than as particularly described and still be within the scope of the accompanying claims.

What is claimed is:

1. A method for purification of a polyphosphazene polyacid or acid salt thereof, comprising:
   a. dissolving said polyphosphazene polyacid or acid salt thereof in an aqueous solution of at least one salt of monovalent ions, wherein said salt of monovalent ions is present in said aqueous solution in an amount of at least 10% by weight;
   b. diluting said aqueous solution of said polyphosphazene polyacid or acid salt thereof and said at least one salt of monovalent ions, such that the concentration of said salt of monovalent ions is less than that in step (a), thereby precipitating said polyphosphazene polyacid or acid salt thereof; and
   c. recovering said precipitated polyphosphazene polyacid or acid salt thereof.

2. The method of claim 1 wherein said at least one salt of monovalent ions is sodium chloride.

3. The method of claim 2 wherein said sodium chloride is present in said solution in step (a) in an amount at from about 10% by weight to about 16% by weight.

4. The method of claim 3 wherein said sodium chloride is present in said solution in step (a) in an amount of from about 14% by weight to about 16% by weight.

5. The method of claim 2 wherein said sodium chloride is present in said solution in step (b) in an amount of from about 4% by weight to about 10% by weight.

6. The method of claim 1 wherein said polyphosphazene polyacid is poly [di(carboxylatophenoxy) phosphazene].

7. The method of claim 1 wherein said aqueous solution of at least one salt of monovalent ions further includes a base.

8. The method of claim 7 wherein said base is a hydroxide of a Group I element.

9. The method of claim 8 wherein said base is potassium hydroxide.

10. The method of claim 7 wherein said base is present in said aqueous solution at a concentration of at least 2 mole/l.

* * * * *